United States Patent [19]

Vander Burgh et al.

[11] 4,227,670
[45] Oct. 14, 1980

[54] PIVOTABLE SEAT SUPPORT

[75] Inventors: Lloyd A. Vander Burgh, Naperville; R. Dale Moore, Wheaton; Joseph Paplaski, Chicago, all of Ill.

[73] Assignee: International Harvester Company, Chicago, Ill.

[21] Appl. No.: 909,425

[22] Filed: May 25, 1978

[51] Int. Cl.$^3$ .................. F16M 13/00; A47C 1/02
[52] U.S. Cl. ................... 248/416; 248/418; 248/430; 297/346
[58] Field of Search ........... 248/418, 416, 425, 429, 248/430, 419, 420; 297/346, 349, 314; 296/65 R

[56] References Cited

U.S. PATENT DOCUMENTS

| | | | |
|---|---|---|---|
| 2,850,074 | 9/1958 | Silverberg et al. | 248/420 |
| 2,892,486 | 6/1959 | Herring et al. | 248/420 |
| 2,932,341 | 4/1960 | Morrison et al. | 297/296 |
| 3,039,732 | 6/1962 | Kopitzki . | |
| 3,071,407 | 1/1963 | Sloan . | |
| 3,113,804 | 12/1963 | Ritter | 108/140 X |
| 3,437,373 | 4/1969 | Boston | 297/349 X |
| 3,659,895 | 5/1972 | Dresden | 248/430 |
| 3,708,203 | 1/1973 | Barecki et al. | 297/346 |
| 3,893,728 | 7/1975 | Holopainen | 297/349 |
| 3,964,713 | 6/1976 | Joslyn | 297/349 X |
| 4,005,845 | 2/1977 | Luppi et al. | 297/346 |
| 4,014,507 | 3/1977 | Swenson | 248/416 |
| 4,062,588 | 12/1977 | Draney | 248/415 |
| 4,134,617 | 1/1979 | Natsubara | 297/349 |

FOREIGN PATENT DOCUMENTS

| | | | |
|---|---|---|---|
| 196952 | 6/1965 | Sweden | 296/65 R |
| 585196 | 1/1947 | United Kingdom | 248/393 |

*Primary Examiner*—James T. McCall
*Attorney, Agent, or Firm*—Douglas W. Rudy; Ronald C. Kamp; F. David AuBuchon

[57] ABSTRACT

A horizontally adjustable seat support may be rotated 180° to lock in either a forward facing position or a rearward facing position. A latching mechanism restricts frame movement from horizontal or pivotable movement but may be partially displaced for free horizontal adjustment without releasing the pivotable lock.

Horizontal seat tracks may engage the lower or alternatively the upper portions of rollers carried between the seat tracks, depending on the lateral position of the seat frame.

7 Claims, 6 Drawing Figures

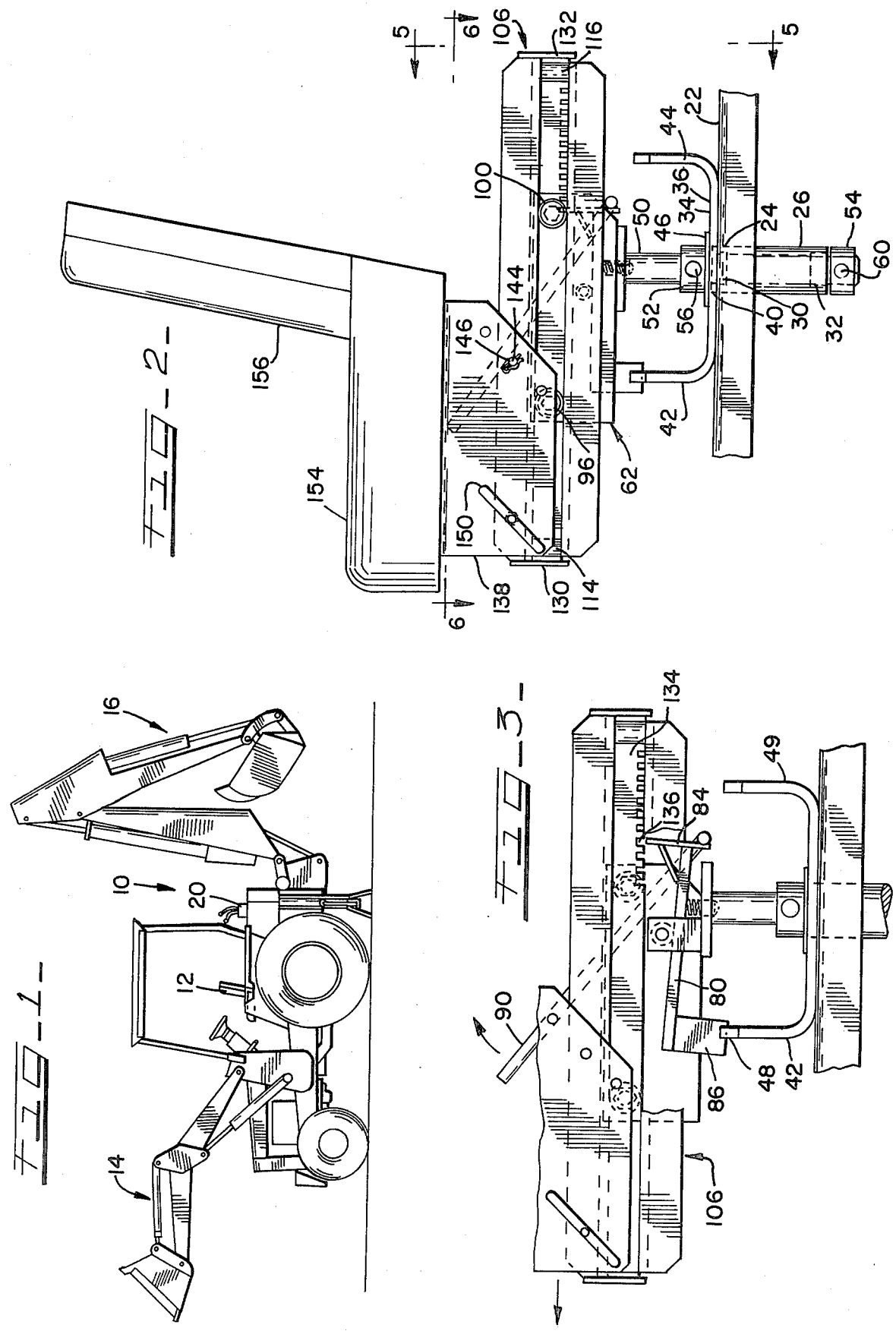

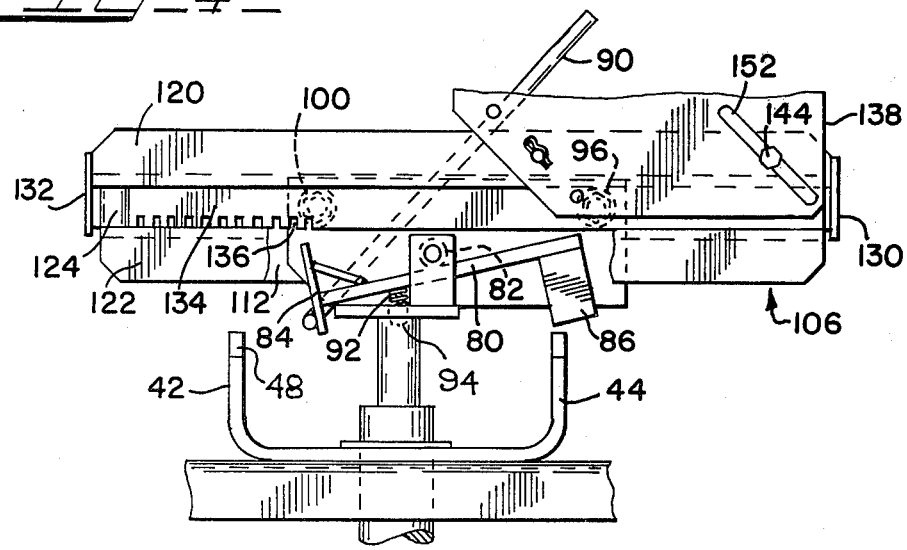
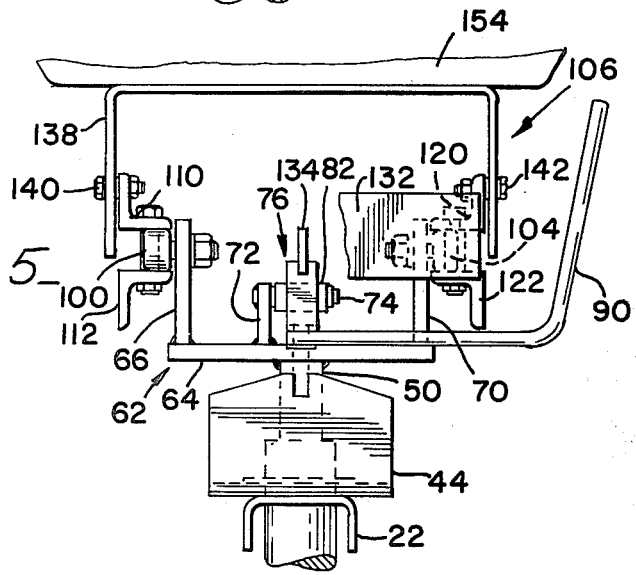
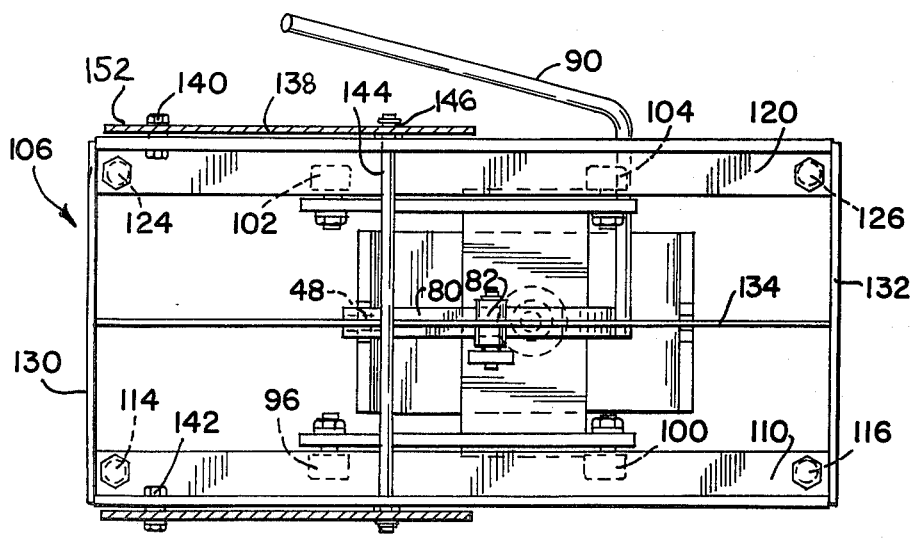

PIVOTABLE SEAT SUPPORT

BACKGROUND OF THE INVENTION

This invention concerns pivotal seat mechanisms having horizontal adjustment abilities.

The invention was designed to provide a horizontally adjustable seat that could be rotated 180° and automatically locked in either a forward or a rearwardly facing position. A significant amount of horizontal travel was essential in order to position the operator in comfortable operating position when he was at a first station, typically operating the front end loader apparatus of an industrial tractor, or when he was at a second station, for instance operating the backhoe apparatus of an industrial tractor.

The specific embodiment presented includes structural components that ensure that the seat will remain attached to the tractor regardless of the magnitude of vertical movement of the seat during normal operating maneuvers. The seat support is readily assembled and disassembled due to the lack of special section seat tracks that in competing devices are complex parts.

Other objects of this invention included providing a strong, simple yet effective adjustable seat.

Further, an object was to provide a seat that is horizontally adjustable and pivotable from a forward facing position to a rearward facing position.

SUMMARY OF THE INVENTION

The seat track and pivot assembly for supporting a seat in an industrial loader backhoe type tractor includes a stem carried in a stem housing which is attached to a portion of the tractor frame. The stem provides a pivotable axle upon which a horizontally adjustable seat frame is positioned. The horizontally adjustable seat frame is constructed primarily of two pairs of roller guides, the roller guides being formed through the use of upper and lower channel section components which are unified into a structure that supports a seat. A plurality of rollers are maintained between the upper and lower angle section components such that the rollers prevent movement of the components in any direction other than horizontal. A latching mechanism is operated by a handle to first unlatch a horizontal restraining means when the handle is displaced through a segment of its range of arcuate travel. When the handle is moved through its entire range of travel a pivotal latching means is disengaged thereby allowing the seat to be pivoted from a forward facing position to a rearward facing position.

The actual operation of the latching means as well as the horizontal tracks will be explained further with reference to the drawing figures attached to this disclosure.

BRIEF DESCRIPTION OF THE DRAWING FIGURES

FIG. 1 is an elevation view of an industrial tractor equipped with a loader and a backhoe, incorporating the seat support invention presented herein;

FIG. 2 is a side elevation view of the seat assembly of this invention;

FIG. 3 is a side elevation view of the seat assembly of FIG. 2 with some parts broken away to reveal a latching mechanism;

FIG. 4 is a side elevation view of the seat assembly of FIG. 3 with the seat support rotated 180° to a rearwardly facing position, some parts are broken away to show the position of the latching mechanism;

FIG. 5 is a front elevation view of the major portion of the seat support with some parts broken away;

FIG. 6 is a top view of the seat support with some parts broken away.

DETAILED DESCRIPTION OF THE INVENTION

In the drawing figures a single embodiment is presented therefore reference characters identify identical parts in all of the figures.

FIG. 1 shows an industrial tractor generally 10 that typically is provided with a pivotal or swivelable seat 12 in order to allow the vehicle operator to face forward when driving or operating the loader 14 or alternatively allows the vehicle operator to face rearward when operating the backhoe generally 16. Backhoe controls 20 are at the extreme rear section of the vehicle, thus in order to enable the operator to reach them and also to give the operator a good field of vision the seat 12 must not only be able to swivel 180°, but also must be horizontally adjustable to bring the operator close to the backhoe controls 20.

The seat support is shown clearly in the side elevation view of FIG. 2. A longitudinal beam 22 under the operator's station is provided with an aperture 24 to accomodate the stem housing 26 which is a tube having a longitudinal bore equipped with a first 30 and a second 32 internal bushing at the respective upper and lower ends of the stem housing. The stem housing 26 projects upwardly a small amount past the upper surface of the beam 22.

A swivel latching trap 34 includes a base 36 that is provided with an aperture 40 to accomodate the upper portion of the stem housing 26. The swivel latching trap 34 includes a front facing upwardly extending member 42 and a rear facing upwardly extending member 44. Each upwardly extending member 42 and 44 is provided with a set of ramps that slope downwardly from the high center point of the upwardly extending members. Also each member is provided with a detent at the upper center of the upwardly extending members.

A bearing plate 46, having a central aperture of a diameter similar to the inside diameter of the stem housing 26 and an overall diameter greater than the diameter of the aperture 40 in the base 36 of the swivel latch trap 34, is provided.

A stem 50 or pivotal support is carried axially in the stem housing 26 but is restrained from significant lateral movement therein by the presence of an upper collar 52 and a lower collar 54. Each collar is pinned, through the use of respective pins 56 and 60 that pass through aligned apertures in the collars and the stem, to the stem 50. The upper end of the stem 50 is welded to the seat support base generally 62.

The seat support base, generally 62, can best be seen in FIG. 5. The seat support base includes a base plate 64 which is welded to the top end of the stem 50, left 66 and right 70 roller supports which are welded to the base plate 64 and a latch arm support 72 which is also welded to the base plate 64.

The latch arm support 72 supports an axle 74 that pivotally accomodates the latching mechanism generally 76.

The latching mechanism 76 is best seen in FIGS. 4, 5 and 6 where the latch arm 80 can be seen attached to the latch arm bushing 82. At one end of the latch arm 80 a first tab 84 or horizontal latching tab is provided while at the other end of the latch arm 80 a second tab 86 or swivel latching tab is provided. A handle 90 is welded to the first tab 84 and extends to a position outboard of the seat support that would be in easy access to an operator sitting on the seat. A latch spring 92 is maintained in a shallow bore 94 in the upper end of the stem 50, and as it is in contact with the latch arm 80, it tends to urge the latch arm upwardly away from the base 64 (ahead of the pivot point of the latch arm).

A plurality of rollers 96, 100, 102, 104 (FIG. 6) are carried at the upper portion of the left and right roller supports 66 and 70. The rollers support the horizontal rail frame generally 106. The horizontal rail frame is made up of a left side track which includes an upper 110 and a lower 112 angle section component which are connected to each other at the ends thereof by bolted-in-place first and second spacers 114 and 116. A right side track includes similar upper 120 and lower 122 angle section components also connected to each other at the ends thereof, by bolted-in-place third 124 and fourth 126 spacers.

The left side track is spaced apart from the right side track by a front transverse plate 130 and a rear transverse plate 132 which are welded to both ends of the respective left and right upper angle section components 110 and 120. They are not welded to the lower angle section components 112 and 122 which, as can be seen in all the side elevation figures, are shorter in overall length than the upper angle section components.

A horizontal latching trap 134 (FIG. 4) having a plurality of notches such as 136 formed in the lower edge thereof is supported between and welded to respective front and rear transverse plates 130 and 132.

A seat support 138 (FIG. 6) is carried on the horizontal rail frame 106 in an adjustable manner through the use of fasteners 140 and 142 and a seat positioning rod 144. The seat positioning rod 144, by its placement in one pair of three pairs of diagonally arranged holes such as 146, provides basic seat elevation while the fasteners 140 and 142 lock the seat at the proper elevation. The diagonal elongated slots 150 and 152 provide ease of adjustment that negates the removal of fasteners in their entirety during adjustments.

The seat proper includes a seat cushion 154 and a back portion 156 as shown in FIG. 2.

OPERATION OF THE SEAT ADJUSTMENTS

FIG. 3 shows the position of the latch arm 80 when horizontal adjustment is desired. The handle 90 has been pulled back just enough to disengage the first tab 84 from the notch 136 in the horizontal latching trap 134. With the first tab 84 disengaged the horizontal rail frame generally 106 is free to be rolled on the rollers 96, 100, 102 and 104 to the desired location. Notice that the second tab 86 is still engaged in the detent 48 thus preventing rotation or swiveling of the seat.

FIG. 4 shows the seat in a position as it is rotated from a forward facing position to a rearward facing position. In this case the handle 90 has been raised far enough to free the second tab from the detent 48 (as well as the notches 136) and the operator has rotated the seat 180°. In FIG. 4 the second tab 86 is significantly elevated above the rear facing upwardly extending member 44 however, in a more typical situation the operator would release the handle 90 while rotating the seat. The second tab 86 would then ride up along the ramp of the member 44 until the second tab 86 falls into the detent. This is analogous to the operation of the striker plate aspects of a conventional door latch. The spring 92 ensures that the latch arm 80 remains in a proper horizontal position when both tabs are in respective notches or detents.

Several other aspects of this device merit comment.

The closeness or spacing between the upper and lower angle section components is just slightly greater than the overall diameter of the rollers housed there between. This allows the rollers to act on the lower and on the upper angle section components when the horizontal rail frame 106 is at an extreme horizontal position. The rollers closest to the near end of the horizontal rail frame will be in primary contact with the upper angle section components while the other rollers will contact either the upper or lower angle section components depending on the load on the seat proper.

The angle section components inherently protect the roller contact paths on the lower angle section components from dirt and debris thus furthering smooth horizontal adjustability.

Thus it is apparent that the above disclosure provides a horizontally adjustable pivotal seat support having numerous advantages both set forth above and recognizable from the foregoing disclosure. While the invention has been described in conjunction with a specific embodiment, it is evident that many alternatives, modifications and variations will be apparent to those skilled in the art in light of the foregoing description. Accordingly, this disclosure is intended to embrace all such alternatives, modifications and variations as fall within the spirit and broad scope of the appended claims.

What is claimed is:

1. A seat track and pivot assembly for supporting a seat comprising:
    a stem housing having a vertical bore;
    a stem carried axially and restrained laterally in said stem housing;
    a seat support base including, a base plate welded to said stem, left and right roller supports welded to said base plate, and a latch arm support welded to said base plate;
    a plurality of rollers attached to said left and right roller supports of said seat support base;
    a horizontal rail frame including, a left side track and a right side track and a horizontal latching trap between said left side track and said right side track, said horizontal rail frame supported for horizontal movement on said plurality of rollers;
    a swivel latching trap axially located on said stem housing;
    a latch arm pivotally supported on said latch arm support of said seat support base, said latch arm having a first tab attached to one end thereof and a second tab attached to the other end of said latch arm; and
    a latch spring restrained between said base plate of said seat support base and said latch arm urging said latch arm to a horizontal position whereby said first tab and said second tab of said latch arm engage respective horizontal latching trap and said swivel latching trap.

2. The invention in accordance with claim 1 wherein said horizontal rail frame further includes a left side track with an upper and a lower angle section component, a right side track with an upper and a lower angle section component, a front transverse plate welded to the front of said left and right upper angle section components, a rear transverse plate welded to the rear of said left and right upper angle section components and a horizontal latching trap, having a plurality of notches, fastened to said front and said rear transverse plates between said left side track and said right side track, said horizontal rail frame supported for horizontal movement on said plurality of rollers, each roller positioned between said upper and lower angle section components.

3. The invention in accordance with claim 1 or claim 2 wherein said swivel latching trap is provided with an aperture base and includes front facing and rear facing upwardly extending members, each having a detent.

4. A seat track and pivot assembly for supporting a seat comprising:
- a stem housing having a vertical bore;
- a stem carried axially and restrained laterally in said stem housing;
- a seat support base including, a base plate welded to said stem, left and right roller supports welded to the base plate, and a latch arm support welded to the base plate;
- a plurality of rollers attached to the left and right roller supports of said seat support base;
- a horizontal rail frame including, a a left side track with an upper and a lower angle section component, a right side track with an upper and a lower angle section component, a front transverse plate welded to the front of said left and right upper angle section components, a rear transverse plate welded to the rear of said left and right upper angle section components and a horizontal latching trap having a plurality of notches fastened to said front and said rear transverse plates, said horizontal rail frame capable of movement on said plurality of rollers, each roller positioned between said upper and lower angle section components;
- a swivel latching trap having an apertured base and including front facing and rear facing upwardly extending members, each having a detent, axially located on said stem housing;
- a latch arm pivotally supported on said latch arm support of said seat support base, said latch arm including a first tab at one end thereof normally engaged with one of said notches of said horizontal latching trap and a second tab at a second end thereof normally engaged with one detent of said swivel latching trap, said latch arm pivotable to disengage said first tab from said horizontal latching trap while said second tab remains engaged with said detent of said swivel latching trap and said latch arm further pivotable to release said second tab from said detent of said swivel latching trap;
- a latch spring restrained between the base plate of said seat support base and said latch arm urging said latch arm to a horizontal position whereby said first tab rests in a notch of said horizontal latching trap of said horizontal rail frame and said second tab of said latching arm rests in a detent of one of said upwardly extending members of said swivel latching trap.

5. The invention in accordance with claim 4 wherein a seat support is carried on said horizontal frame rail, and is attached thereto by a plurality of fasteners and a seat support rod passing through respective seat support and said horizontal frame rail.

6. The invention in accordance with claim 1 wherein a handle is welded to said first tab of said latch arm.

7. The invention in accordance with claim 4 wherein a handle is welded to said first tab of said latch arm.

* * * * *